United States Patent
Reichelt et al.

(10) Patent No.: US 10,227,427 B2
(45) Date of Patent: Mar. 12, 2019

(54) PROCESS FOR PREPARING PROPYLENE/1-BUTENE COPOLYMERS

(71) Applicant: Borealis AG, Vienna (AT)

(72) Inventors: Kristin Reichelt, Krems (AT); Wilfried Töltsch, Marchtrenk (AT); Luigi Resconi, Ferrara (IT)

(73) Assignee: Borealis AG, Vienna (AT)

( * ) Notice: Subject to any disclaimer, the term of this patent is extended or adjusted under 35 U.S.C. 154(b) by 194 days.

(21) Appl. No.: 15/106,101

(22) PCT Filed: Jan. 12, 2015

(86) PCT No.: PCT/EP2015/050406
§ 371 (c)(1),
(2) Date: Jun. 17, 2016

(87) PCT Pub. No.: WO2015/107020
PCT Pub. Date: Jul. 23, 2015

(65) Prior Publication Data
US 2016/0311951 A1    Oct. 27, 2016

(30) Foreign Application Priority Data
Jan. 17, 2014 (EP) ..................... 14151597

(51) Int. Cl.
| C08F 210/16 | (2006.01) |
| C08F 4/64 | (2006.01) |
| C08F 210/06 | (2006.01) |
| B32B 27/32 | (2006.01) |
| C08J 5/18 | (2006.01) |
| C08F 110/02 | (2006.01) |

(52) U.S. Cl.
CPC ............ C08F 210/06 (2013.01); B32B 27/32 (2013.01); C08J 5/18 (2013.01); B32B 2307/518 (2013.01); C08F 110/02 (2013.01); C08F 2410/00 (2013.01); C08F 2410/04 (2013.01); C08F 2500/12 (2013.01); C08F 2500/26 (2013.01); C08F 2800/10 (2013.01); C08J 2323/14 (2013.01)

(58) Field of Classification Search
CPC ........ C08F 4/16; C08F 4/6421; C08F 4/6498; C08F 210/16
See application file for complete search history.

(56) References Cited

U.S. PATENT DOCUMENTS

| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,407,883 A * | 4/1995 | Fushimi ................. C08F 10/00 502/125 |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,691,043 A | 11/1997 | Keller et al. |
| 5,693,838 A | 12/1997 | Sangokoya et al. |
| 5,723,560 A | 3/1998 | Canich |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,322,883 B1 | 11/2001 | Williams |
| 6,365,682 B1 | 4/2002 | Alastalo et al. |

(Continued)

FOREIGN PATENT DOCUMENTS

| CN | 101563226 A | 11/1997 |
| CN | 1248198 A | 3/2000 |

(Continued)

OTHER PUBLICATIONS

U.S. Appl. No. 14/911,295, filed Feb. 10, 2016.

(Continued)

*Primary Examiner* — Rip A Lee
(74) *Attorney, Agent, or Firm* — Leydig, Voit & Mayer, Ltd.

(57) ABSTRACT

The present invention relates to an olefin polymerization process, wherein propylene and 1-butene and optionally ethylene are reacted in the presence of a Ziegler-Natta catalyst system so as to obtain a polypropylene, wherein the polypropylene comprises 1-butene-derived comonomer units in an amount of from 5 to 20 wt % and optionally ethylene-derived comonomer units in an amount of up to 3 wt %, and the Ziegler-Natta catalyst system comprises an external donor of the following formula (I): $(R^3)_z(R^2O)_y Si(R^1)_x$.

12 Claims, 1 Drawing Sheet

(56) References Cited

U.S. PATENT DOCUMENTS

Figure 1:
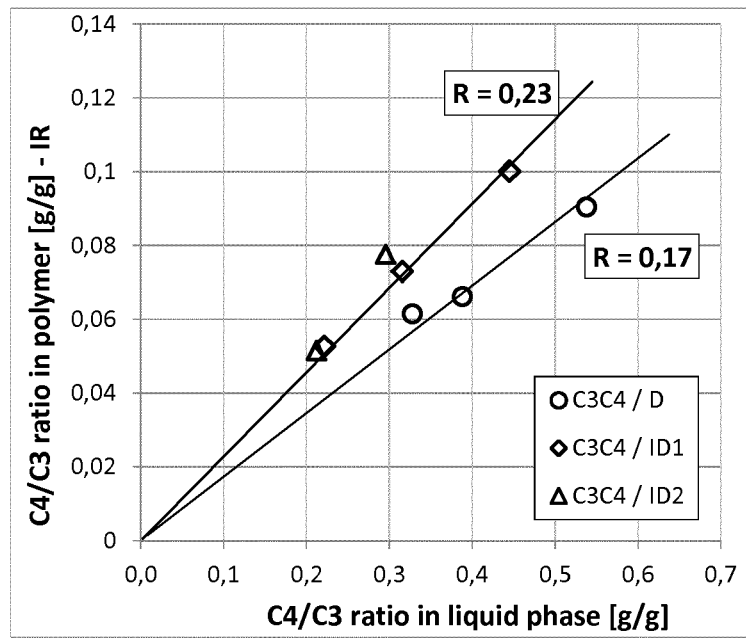

| | | |
|---|---|---|
| 6,586,528 B1 | 7/2003 | Delaite et al. |
| 6,642,317 B1 | 11/2003 | Delaite et al. |
| 7,319,125 B2 | 1/2008 | Arjunan et al. |
| 7,342,078 B2 | 3/2008 | Schottek et al. |
| 7,354,979 B2 | 4/2008 | Brant et al. |
| 7,378,472 B2 | 5/2008 | Fell et al. |
| 7,429,634 B2 | 9/2008 | Brant et al. |
| 7,569,651 B2 | 8/2009 | Schottek et al. |
| 8,709,561 B2 | 4/2014 | Bernreitner et al. |
| 8,779,062 B2 | 7/2014 | Paavilainen et al. |
| 8,889,792 B2 | 11/2014 | Paavilainen et al. |
| 9,181,423 B2 | 11/2015 | Kock et al. |
| 9,243,137 B2 | 1/2016 | Reichelt et al. |
| 9,650,457 B2 * | 5/2017 | Marzolla ............... C08F 210/06 |
| 2003/0149199 A1 | 8/2003 | Schottek et al. |
| 2004/0033349 A1 | 2/2004 | Henderson |
| 2004/0122191 A1 | 6/2004 | Arjunan et al. |
| 2004/0127654 A1 | 7/2004 | Brant et al. |
| 2005/0136274 A1 | 6/2005 | Hamulski et al. |
| 2005/0187367 A1 | 8/2005 | Hori et al. |
| 2005/0197456 A1 * | 9/2005 | Nicolini .................... C08J 5/18 525/191 |
| 2005/0200046 A1 | 9/2005 | Breese |
| 2006/0020096 A1 | 1/2006 | Schottek et al. |
| 2006/0034777 A1 | 2/2006 | Mahling et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2006/0211832 A1 | 9/2006 | Brant et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2012/0220727 A1 | 8/2012 | Klimke et al. |
| 2013/0030121 A1 | 1/2013 | Alamo et al. |
| 2013/0045862 A1 | 2/2013 | Valonen et al. |
| 2013/0167486 A1 | 7/2013 | Aarnio et al. |
| 2013/0178573 A1 | 7/2013 | Paavilainen et al. |
| 2013/0203908 A1 | 8/2013 | Kock et al. |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |

FOREIGN PATENT DOCUMENTS

| | | | |
|---|---|---|---|
| CN | 1267310 A | 9/2000 | |
| CN | 1582317 A | 2/2005 | |
| CN | 1684988 A | 10/2005 | |
| CN | 1701081 A | 11/2005 | |
| CN | 1823106 A | 8/2006 | |
| CN | 101573231 A | 11/2009 | |
| CN | 101772376 A | 7/2010 | |
| CN | 101903103 A | 12/2010 | |
| CN | 102869719 A | 1/2013 | |
| CN | 103068574 A | 4/2013 | |
| CN | 103080212 A | 5/2013 | |
| CN | 103347951 A | 10/2013 | |
| EP | 0 045 977 B1 | 1/1987 | |
| EP | 0 260 130 A1 | 3/1988 | |
| EP | 0 279 586 A2 | 8/1988 | |
| EP | 0 045 975 B1 | 4/1989 | |
| EP | 0 045 976 B1 | 11/1989 | |
| EP | 0 361 493 A1 | 4/1990 | |
| EP | 0 423 101 A2 | 4/1991 | |
| EP | 0 488 595 A1 | 6/1992 | |
| EP | 0 491 566 A2 | 6/1992 | |
| EP | 0 537 130 A1 | 4/1993 | |
| EP | 0 561 476 A1 | 9/1993 | |
| EP | 0 045 976 B2 | 12/1993 | |
| EP | 0 594 218 A1 | 4/1994 | |
| EP | 0 279 586 B1 | 5/1994 | |
| EP | 0 622 380 A1 | 11/1994 | |
| EP | 0 045 977 B2 | 3/1995 | |
| EP | 0 645 417 A1 | 3/1995 | |
| EP | 0 728 769 A1 | 8/1996 | |
| EP | 0 586 390 B1 | 5/1997 | |
| EP | 0 591 224 B1 | 2/1998 | |
| EP | 0 887 379 A1 | 12/1998 | |
| EP | 0 887 380 A1 | 12/1998 | |
| EP | 0 887 381 A1 | 12/1998 | |
| EP | 1 028 984 B1 | 7/2001 | |
| EP | 1 359 171 A1 | 11/2003 | |
| EP | 1 376 516 A1 | 1/2004 | |
| EP | 1 452 630 A1 | 9/2004 | |
| EP | 1 183 307 B1 | 7/2005 | |
| EP | 0 991 684 B1 | 1/2006 | |
| EP | 1 632 529 A1 | 3/2006 | |
| EP | 1 448 622 B1 | 4/2006 | |
| EP | 1 726 602 A1 | 11/2006 | |
| EP | 1 741 725 A1 | 1/2007 | |
| EP | 1 788 023 A1 | 5/2007 | |
| EP | 1 883 080 A1 | 1/2008 | |
| EP | 1 892 264 A1 | 2/2008 | |
| EP | 1 923 200 A1 | 5/2008 | |
| EP | 1 941 997 A1 | 7/2008 | |
| EP | 1 941 998 A1 | 7/2008 | |
| EP | 1 947 143 A1 | 7/2008 | |
| EP | 1 990 353 A1 | 11/2008 | |
| EP | 2 014 714 A1 | 1/2009 | |
| EP | 2020291 A1 * | 2/2009 | ............ B32B 27/00 |
| EP | 2 062 936 A1 | 5/2009 | |
| EP | 2 065 087 A1 | 6/2009 | |
| EP | 2 075 284 A1 | 7/2009 | |
| EP | 2 174 980 A1 | 4/2010 | |
| EP | 2 251 361 A1 | 11/2010 | |
| EP | 2 386 582 A1 | 11/2011 | |
| EP | 2 386 583 A1 | 11/2011 | |
| EP | 2 386 602 A1 | 11/2011 | |
| EP | 2 386 604 A1 | 11/2011 | |
| EP | 2 038 346 B1 | 1/2012 | |
| EP | 2 410 007 A1 | 1/2012 | |
| EP | 2 415 831 A1 | 2/2012 | |
| EP | 2 423 257 A1 | 2/2012 | |
| EP | 1 358 252 B1 | 4/2012 | |
| EP | 2 308 923 B1 | 5/2012 | |
| EP | 2 487 203 A1 | 8/2012 | |
| EP | 2 532 687 A2 | 12/2012 | |
| EP | 2 546 298 A1 | 1/2013 | |
| EP | 2 551 299 A1 | 1/2013 | |
| EP | 2 565 221 A1 | 3/2013 | |
| EP | 2 573 134 A1 | 3/2013 | |
| EP | 2 592 112 A1 | 5/2013 | |
| EP | 2 610 270 A1 | 7/2013 | |
| EP | 2 610 271 A1 | 7/2013 | |
| EP | 2 610 272 A1 | 7/2013 | |
| EP | 2 610 273 A1 | 7/2013 | |
| EP | 2 666 818 A1 | 11/2013 | |
| JP | 59-98112 A * | 6/1984 | ............ C08F 210/18 |
| JP | 4-208292 A * | 7/1992 | |
| JP | 57-125207 A * | 8/1992 | |
| JP | 8-151388 A * | 6/1996 | |
| JP | 09-48812 A * | 2/1997 | |

(56) References Cited

FOREIGN PATENT DOCUMENTS

| | | |
|---|---|---|
| JP | 9-59322 A * | 3/1997 |
| JP | 2013-525531 A | 6/2013 |
| JP | 2013-525532 A | 6/2013 |
| WO | WO 1987/007620 A1 | 12/1987 |
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |
| WO | WO 2003/000754 A1 | 1/2003 |
| WO | WO 2003/000755 A2 | 1/2003 |
| WO | WO 2003/000756 A1 | 1/2003 |
| WO | WO 2003/000757 A1 | 1/2003 |
| WO | WO 03/037981 A1 | 5/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/083576 A1 * | 6/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |
| WO | WO 2015/177094 A1 | 11/2015 |

OTHER PUBLICATIONS

U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
U.S. Appl. No. 15/310,283, filed Nov. 10, 2016.
"Glossary of Basic Terms in Polymer Science (IUPAC Recommendations 1996)," *Pure Appl. Chem.*, 68(8):1591-1595 (1996).

(56) References Cited

OTHER PUBLICATIONS

"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J. Appl. Polymer Sci* 68:1493-1501 (1998).
Atwood. "Chapter 6: Anionic and Cationic Organoaluminum Compounds." *Coord. Chem. Alum.*, VCH, New York, NY, pp. 197-232 (1993).
Britovsek et al., "The Search for New-Generation Olefin Polymerization Catalysts: Life beyond Metallocenes," *Angew. Chem, Int. Ed.*, vol. 38(4), pp. 428-447 (1999).
Busico et al., "Alk-l-ene Polymerization in the Presence of a Monocyclopentadienyl Zirconium(IV) Acetamidinate Catalyst: Microstructural and Mechanistic Insights$^a$," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Cheng, "$^{13}$C NMR Analysis of Ethylene-Propylene Rubbers," *Macromolecules* 17:1950-1955 (1984).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/l-Butene Copolymers," *Makromol. Chem.* 181:1747-1755 (1980).
Filip et al., "Heteronuclear decoupling under fast MAS by a rotor-synchronized Hahn-echo pulse train,"*J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).
Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).
Holbrey et al., "Liquid ciathrate formation in ionic liquid-aromatic mixtuies," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
Koch et al., "Evaluation of scratch resistance in multiphase PP blends," *Polymer Testing* 26: 927-936 (2007).
McAuley et al., "On-line Inference of Polymer Properties in an Industrial Polyethylene Reactor," *AIChE Journal*, vol. 37, No. 6, pp. 825-835 (1991).
Myhre et al., "Oriented PE films—Expanding Opportunities with Borstar® PE," *Maack Speciality Films*, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).
Periodic Table (IUPAC Jun. 22, 2007).
*Plastics Additives Handbook*, 5th edition, Hans Zweifel, Editor, Hanser Publishers, Munich, pp. 871-873, (2001).
*Plastics Additives Handbook*, 5th edition, Hans Zweifel, Editor, Hanser Publishers, Munich, pp. 956-965 (2001).
Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).
*Propylene Handbook*, $2^{nd}$ *Edition*, Chapter 7.2.2 "Oriented Films," pp. 405-415, Nello Pasquini, Editor, Hanser (2005).
Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).
Resconi et al., "Diastereoselective Synthesis, Molecular Structure, and Solution Dynamics of meso- and rac-[Ethylenebis(4,7-dimethyl-↓5-1-indenyl]zirconium Dichloride Isomers and Chain Transfer Reactions in Propene Polymerization with the rac Isomer," *Organometallics* 15(23):5046-5059 (1996).
Resconi et al., "Highly Regiospecific Zirconocene Catalysts for the Isospecific Polymerization of Propene," *JACS* 120(10):2308-2321 (1998).
Resconi et al., "Selectivity in Propene Polymerization with Metallocene Catalysts," *Chem. Rev.* 100(4):1253-1345 (2000).
Singh et al., "Triad sequence determination of ethylene-propylene copolymers—application of quantitative $^{13}$C NMR," *Polymer Testing* 28(5):475-479 (2009).
Spaleck et al., "The Influence of Aromatic Substituents on the Polymerization Behavior of Bridged Zirconocene Catalysts," *Organometallics* 13:954-963 (1994).
Spear et al., "Liquid Clathrates," *Encyclopedia of Supramolecular Chemistry*, J.L. Atwood and J.W. Steed (Eds.); Marcel Dekker: New York, pp. 804-808 (2004).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
"Polyethylene Lumicene® mPE M5510 EP," Total Refining & Chemicals, Total Ecosolutions, Belgium, Aug. 2013 (2 pgs.).
European Patent Office, International Search Report in International Application No. PCT/EP2015/050406 (dated Mar. 12, 2015).
European Patent Office, Written Opinion in International Application No. PCT/EP2015/050406 (date Mar. 12, 2015).
International Bureau of WIPO, International Preliminary Report on Patentability in International Application No. PCT/EP2015/050406 (dated Jul. 19, 2016).
European Patent Office, Extended European Search Report in European Patent Application No. 14151597.3 (dated Jun. 13, 2014).
Intellectual Property Office of the People's Republic of China, Office Action issued in Chinese Patent Application No. 201580003208.1 (dated Mar. 2, 2017).

* cited by examiner

PROCESS FOR PREPARING PROPYLENE/1-BUTENE COPOLYMERS

CROSS-REFERENCE TO RELATED APPLICATIONS

This patent application is the U.S. national phase of International Application No. PCT/EP2015/050406, filed on Jan. 12, 2015, which claims the benefit of European Patent Application No. 14151597.3, filed Jan. 17, 2014, the disclosures of which are incorporated herein by reference in their entireties for all purposes.

The present invention relates to an olefin polymerization process, wherein propylene and 1-butene and optionally ethylene are reacted in the presence of a Ziegler-Natta catalyst system comprising an external donor.

It is known that polypropylene comprising comonomer units derived from a higher alpha-olefin (such as 1-butene or 1-hexene) and optionally ethylene-derived comonomer units is useful for preparing polypropylene films such as cast, blown and BOPP films. Among other articles, flexible packaging can be prepared from such polypropylene materials.

A polypropylene having comonomer units of a higher alpha-olefin (e.g. a $C_{4-10}$ alpha-olefin) and optionally ethylene comonomer units (i.e. a terpolymer if $C_2$ comonomer units are present as well) can be prepared in the presence of a Ziegler-Natta catalyst system. However, for the preparation process to be efficient, it is important that the catalyst system has a high reactivity for the $C_{4-10}$ alpha-olefin used as comonomer. Drawbacks arising from a low reactivity for the $C_{4-10}$ alpha-olefin comonomer are e.g. increasing amounts of the alpha-olefin comonomer that are needed for introducing a certain amount of higher alpha-olefin comonomer units into the polymer and/or removal of non-reacted higher alpha-olefin from the polymer powder.

Typically, ethylene is of higher reactivity than a $C_{4-10}$ alpha-olefin. So, in particular for the preparation of propylene terpolymers having comonomer units derived from a higher alpha-olefin and from ethylene, it is very important that the used catalyst system has a sufficiently high reactivity for the $C_{4-10}$ alpha-olefin component.

Depending on the final application, the polypropylene needs to be subjected to further process steps such as extrusion or moulding (e.g. cast moulding, blow moulding, etc.). For these processing steps, the polypropylene should have good processability (as indicated e.g. by a sufficiently high melt flow rate). Furthermore, the polypropylene should have product properties which are consistent with the intended final application. Just as an example, if the polypropylene shall be used for preparing food packaging, it is preferred to keep the amount of xylene solubles on a sufficiently low level. So, a catalyst system should comply with both requirements, i.e. having a high reactivity for a specific $C_{4-10}$ alpha-olefin comonomer and enabling the preparation of a $C_3/C_{4-10}$ copolymer (and optionally a $C_3/C_{4-10}/C_2$ terpolymer) having properties (such as xylene solubles) which are consistent with the intended use.

WO 2009/077287 A1 describes a process for the preparation of a polypropylene comprising 1-hexene derived comonomer units. Such C3/C6 copolymers can be used for preparing blown films (e.g. in food packaging applications). The C3/C6 copolymer can be prepared in the presence of a Ziegler-Natta catalyst comprising an external donor such as thexyltrimethoxysilane. However, the process described in WO 2009/077287 A1 results in a polypropylene having a high amount of xylene solubles. In comparative examples of WO 2009/077287 propylene-butene copolymers with 15 wt-% of butene were used in film preparation. However, no process or catalyst details are given for the polymers used in comparative film products.

It is an object of the present invention to provide a process for preparing a polypropylene comprising comonomer units derived from a higher alpha-olefin and optionally from ethylene, wherein the higher alpha-olefin comonomer is incorporated into the polymer chain at high yield while still providing a polypropylene having properties which are consistent with the intended use (e.g. as a packaging material).

According to a first aspect of the present invention, the object is solved by an olefin polymerization process, wherein propylene and 1-butene and optionally ethylene are reacted in the presence of a Ziegler-Natta catalyst system so as to obtain a polypropylene, wherein the polypropylene comprises 1-butene-derived comonomer units in an amount of from 5 to 20 wt % and optionally ethylene-derived comonomer units in an amount of up to 3 wt %, and the Ziegler-Natta catalyst system comprises an external donor of the following formula (I)

wherein
x is 1 or 2; y is 2 or 3; and z is 0 or 1; under the provision that x+y+z=4;
$R^1$ is an organic residue of the following formula (II)

wherein
the carbon atom bonded to the Si atom is a tertiary carbon atom and each of the residues $R^4$ and $R^5$ bonded to the tertiary carbon atom is, independently from each other, $C_{1-2}$ alkyl;
each of the residues $R^6$ and $R^7$ is, independently from each other, $C_{1-2}$ alkyl;
$R^8$ is hydrogen or a $C_{1-4}$ alkyl;
$R^2$ is $C_{1-2}$ alkyl;
$R^3$ is $C_{1-4}$ alkyl, preferably methyl or ethyl.

In the present invention, it has been realized that a higher alpha-olefin can be very efficiently incorporated into the polymer chain (even if ethylene is present as well) while still achieving desirable product properties such as low XS when the higher alpha-olefin is 1-butene and a Ziegler-Natta catalyst system containing the specific external donor specified above is used. As will be discussed below in further detail, a Ziegler-Natta catalyst system comprising the specific silane compound of formula (I) acting as an external donor has a very high reactivity for 1-butene. Thus, less 1-butene has to be fed to the polymerization reactor for accomplishing a certain content of 1-butene-derived comonomer units in the final polymer and/or less non-reacted 1-butene has to be removed from the polymer powder.

In a preferred embodiment, x is 1 and y is 3, i.e. one $R^1$ residue and three $R^2O$ residues, which can be the same or different, are bonded to the Si atom. According to another preferred embodiment, x is 1, y is 2 and z is 1.

Preferably, x is 1, y is 3 (and therefore z=0), $R^4$, $R^5$, $R^6$ and $R^7$ are methyl, and $R^8$ is hydrogen or $C_{1-2}$ alkyl. More preferably, x is 1, y is 3, $R^4$, $R^5$, $R^6$ and $R^7$ are methyl, and $R^8$ is hydrogen.

According to a preferred embodiment, x is 1, y is 3, $R^2$ is methyl, $R^4$, $R^5$, $R^6$ and $R^7$ are methyl, and $R^8$ is hydrogen.

According to another preferred embodiment, x is 1, y is 3, $R^2$ is ethyl, $R^4$, $R^5$, $R^6$ and $R^7$ are methyl, and $R^8$ is hydrogen.

According to another preferred embodiment, x is 1, y is 2, z is 1, $R^2$ is methyl or ethyl, $R^3$ is methyl or ethyl, $R^4$, $R^5$, $R^6$ and $R^7$ are methyl, and $R^8$ is hydrogen.

As indicated above, the polypropylene comprises 1-butene-derived comonomer units in an amount of from 5 to 20 wt %. Preferably, the amount of 1-butene-derived comonomer units in the polypropylene is from 5 wt % to 13 wt %, even more preferably from 6 wt % to 11 wt %.

The polypropylene prepared in the process of the present invention can be a copolymer containing the 1-butene-derived comonomer units but no other comonomer units (such as ethylene-derived comonomer units and comonomer units derived from a $C_{5-10}$ alpha-olefin).

As already mentioned above, 1-butene is still very efficiently incorporated into the polymer chain even if ethylene as a further comonomer is present. So, preferably, the polypropylene prepared in the process of the present invention contains ethylene-derived comonomer units in an amount of up to 3 wt %, more preferably 0.5 wt % to 2.5 wt %.

In a preferred embodiment, the polypropylene prepared in the process of the present invention is a terpolymer comprising 1-butene-derived comonomer units in an amount of from 5 wt % to 20 wt %, more preferably from 5 wt % to 13 wt %, even more preferably 7 wt % to 11 wt %, and ethylene-derived comonomer units in an amount of up to 3 wt %, more preferably from 0.5 wt % to 2.5 wt %. As the term "terpolymer" implies, apart from propylene-derived monomer units and comonomer units derived from 1-butene and ethylene, no other comonomer units are present in said terpolymer.

Process conditions for providing a certain comonomer content in the final polymer are commonly known to the skilled person or can easily be established on the basis of common general knowledge.

As already mentioned above, using the specific silane compound of formula (I) as external donor in combination with 1-butene as the higher alpha-olefin comonomer does not only result in a very efficient comonomer incorporation but also makes accessible a polypropylene having beneficial product properties.

Preferably, the polypropylene has a melt flow rate $MFR_2$ of from 1.0 to 100 g/10 min, more preferably 1.0 to 30 g/10 min.

In a preferred embodiment, the polypropylene has a melt flow rate $MFR_2$ of from 3.0 to 20 g/10 min, more preferably 4.0 to 15 g/10 min. These $MFR_2$ values are in particular useful for preparing a cast or biaxially oriented polypropylene (BOPP) film.

According to another preferred embodiment, the polypropylene has a melt flow rate $MFR_2$ of from 0.5 to 5.0 g/10 min, more preferably 1.0 to 4.0 g/10 min or from 1.0 to 3.0 g/10 min. These $MFR_2$ values are in particular useful for preparing a blown film.

Apart from the specific external donor defined above, a Ziegler-Natta catalyst system as commonly known to the skilled person can be used in the present invention.

Preferably, the Ziegler-Natta catalyst system comprises a Ziegler-Natta procatalyst and an organometallic cocatalyst.

These catalyst components are generally known to the skilled person. Typically, the Ziegler-Natta procatalyst comprises a titanium compound and optionally an internal donor which preferably is an electron-donor compound. The titanium compound and optionally the internal donor are preferably supported on a solid magnesium compound.

Appropriate internal donors of Ziegler-Natta catalyst systems are generally known to the skilled person and include e.g. ethylbenzoate, phthalic acid mono- or diesters such as a mono- or di-$C_{1-2}$ alkyl phthalate or di-iso-butylphthalate, 1,3-diethers or succinates.

In a preferred embodiment, the internal donor being present in the Ziegler-Natta procatalyst is a trans-esterification product of a $C_{1-2}$ alcohol and a phthalic acid ester.

Preferably, the Ziegler-Natta procatalyst is obtainable or obtained by
a) reacting a spray crystallized or emulsion solidified adduct of $MgCl_2$ and a $C_{1-2}$ alcohol with $TiCl_4$
b) reacting the product of stage a) with a dialkylphthalate of formula (I)

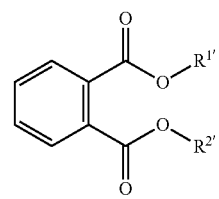

(I)

wherein $R^{1'}$ and $R^{2'}$ are independently an alkyl group having at least 5 carbon atoms, under conditions where a transesterification between said $C_1$ to $C_2$ alcohol and said dialkylphthalate of formula (I) takes place,
c) optionally washing the product of stage b) and/or
d) optionally reacting the product of step b) or step c) with additional $TiCl_4$.

The organometallic cocatalyst may comprise at least one compound selected from a trialkylaluminium, a dialkyl aluminium chloride, an alkyl aluminium sesquichloride, or any mixture thereof. Preferably, alkyl is ethyl or isobutyl.

In the Ziegler-Natta catalyst system of the present invention, the molar ratio of aluminium (from the organometallic cocatalyst) to Ti can vary over a broad range. Preferably, the molar ratio of aluminium to Ti in the Ziegler-Natta catalyst system is from 10 to 1000, more preferably from 50 to 500.

In the Ziegler-Natta catalyst system of the present invention, the molar ratio of the external donor to titanium (from the Ziegler-Natta procatalyst) can vary over a broad range. Preferably, the molar ratio of the external donor to titanium in the Ziegler-Natta catalyst system is from 1 to 100, more preferably from 5 to 50.

The polymerization process for the production of the polypropylene may be a continuous process or a batch process utilising known methods and operating in liquid phase, optionally in the presence of an inert diluent, or in gas phase or by mixed liquid-gas techniques.

The polypropylene may be produced by a single- or multistage polymerisation process such as bulk polymerization, gas phase polymerization, slurry polymerization, solution polymerization or combinations thereof using the Ziegler-Natta catalyst system as described above.

The polypropylene can be made e.g. in one or two loop reactor(s) or in a combination of one or two loop reactor(s) and one gas phase reactor. Those processes are well known to one skilled in the art.

If polymerization is performed in one or two loop reactors, the polymerization is preferably carried out in liquid propylene/butene mixtures at temperatures in the range from 20° C. to 100° C. Preferably, temperatures are in the range from 60° C. to 80° C. The pressure is preferably between 5 and 60 bar. The molecular weight of the polymer chains and thereby the melt flow rate of the polypropylene, is regulated by adding hydrogen.

The process may also comprise an in-line prepolymerization step. The catalyst can also be pre-polymerized off-line, e.g. with ethylene, propylene, or vinylcyclohexane. The off-line pre-polymerization degree (in gram of polymer per gram of catalyst) can be between 0, 5 and 100, preferably between 1 and 50.

The in-line prepolymerization can be conducted as bulk slurry polymerization in liquid propylene or propylene/butene mixtures, i.e. the liquid phase mainly comprises propylene and optionally butene, with minor amount of other reactants and optionally inert components dissolved therein.

The prepolymerization reaction is typically conducted at a temperature of 0 to 50° C., preferably from 10 to 45° C.

If a prepolymerisation step is carried out, it is possible that all catalyst components are introduced to the prepolymerization reactor. However, in principle, it is also possible that only a part of the cocatalyst is introduced into the prepolymerization stage and the remaining part into subsequent polymerization stages.

Hydrogen may be added into the prepolymerization stage to control the molecular weight of the prepolymer as is known in the art. Further, an antistatic additive may be used to prevent the particles from adhering to each other or to the walls of the reactor.

The precise control of the prepolymerization conditions and reaction parameters is within the skill of the art.

According to a further aspect, the present invention relates to a polypropylene, which is obtainable by the process as described above.

With regard to the preferred properties of the polypropylene, reference can be made to the statements already made above.

According to a further aspect, the present invention relates to a film, comprising the polypropylene as described above.

Preferably, the film is selected from a blown film, a cast film or a BOPP film.

The film can be oriented, either mono-axially or bi-axially. Alternatively, the film can be non-oriented.

The film can be a layer, more preferably a sealing layer, in a multilayered biaxially oriented polypropylene (BOPP) film. So, according to another preferred embodiment, the present invention provides a multilayered biaxially oriented polypropylene (BOPP) film comprising a sealing layer which comprises the polypropylene as described above.

According to a further aspect, the present invention relates to a process for preparing a polypropylene film, which comprises
    preparing a polypropylene by the olefin polymerisation process described above, and
    processing the polypropylene to a film.

The polypropylene can be processed to a film by commonly known methods such as blow moulding, cast moulding, and extrusion moulding.

According to a further aspect, the present invention relates to the use of a Ziegler-Natta catalyst system which comprises an external donor of the following formula (I)

wherein
    x is 1 or 2; y is 2 or 3; and z is 0 or 1; under the provision that x+y+z=4;
    $R^1$ is an organic residue of the following formula (II)

wherein
    the carbon atom bonded to the Si atom is a tertiary carbon atom and each of the residues $R^4$ and $R^5$ bonded to the tertiary carbon atom is, independently from each other, $C_{1-2}$ alkyl;
    each of the residues $R^6$ and $R^7$ is, independently from each other, $C_{1-2}$ alkyl;
    $R^8$ is hydrogen or a $C_{1-4}$ alkyl;
    $R^2$ is $C_{1-2}$ alkyl;
    $R^3$ is $C_{1-4}$ alkyl, preferably methyl or ethyl;
for manufacturing a polypropylene which comprises 1-butene-derived comonomer units in an amount of from 5 to 20 wt % and optionally ethylene-derived comonomer units in an amount of up to 3 wt %.

With regard to the preferred properties of the Ziegler-Natta catalyst system and the polypropylene, reference can be made to the statements provided above.

The present invention will now be described in further detail by the following Examples.

EXAMPLES

I. Measuring Methods

If not otherwise indicated, the parameters mentioned in the present application are measured by the methods outlined below.

1. Comonomer Content by IR Spectroscopy

The 1-butene content and, if present, the ethylene content of the copolymers or terpolymers has been measured by FT-IR spectroscopy.

Before measuring, the stabilized powder was pressed in the IR press as follows:

Press Settings to Homogenise the Material:
press temperature: 210° C.
melting time: 90 sec
cooling rate: 12° C/min
de-moulding temperature between 35 and 45° C.

| | step | |
| --- | --- | --- |
| | 1 | 2 (cooling) |
| duration (sec.) | 90 | 900 |
| Temperature (° C.) | 210 | 30 |
| pressure (bar) | 0 | 0 |

Press Settings for IR Plate:
press temperature: 210° C.
melting time: 45 sec
press pressure: 3 steps (10/30/90 bar)
cooling rate: 12° C./min
de-moulding temperature: between 35 and 45° C.

| | 1 | 2 | 3 | 4 | 5 (cooling) |
|---|---|---|---|---|---|
| duration (sec.) | 45 | 15 | 15 | 15 | 900 |
| Temperature (° C.) | 210 | 210 | 210 | 210 | 30 |
| pressure (bar) | 0 | 10 | 30 | 90 | 90 |

The films had a thickness of between 260 and 300 μm

Spectra have been recorded in transmission mode. Relevant instrument settings include a spectral window of 5000 to 400 wave-numbers (cm$^{-1}$), a resolution of 2.0 cm$^{-1}$ and 16 scans. The butene content of the propylene-butene copolymers was determined using the baseline corrected peak maxima of a quantitative band at 767 cm$^{-1}$, with the baseline defined from 1945 to 625 cm$^1$. The comonomer content in mol % was determined using a film thickness method using the intensity of the quantitative band 1767 (absorbance value) and the thickness (T, in cm) of the pressed film using the following relationship:

$$\text{mol } \% \ C4 = (1767/T - 1.8496)/1.8233$$

In case of a propylene-ethylene-butene terpolymer, the 1-butene content was measured as described above but determined using the baseline corrected peak at 780 cm$^{-1}$–750 cm$^{-1}$ and the ethylene content was determined using the baseline corrected peak at 748 cm$^{-1}$ to 710 cm$^{-1}$.

2. Amount of Xylene Solubles (XS, wt.-%)

The amount of xylene solubles was determined at 25° C. according to ISO 16152; first edition; 2005-07-01.

3. MFR$_2$

Melt flow rate MFR$_2$ was measured according to ISO 1133 (230° C., 2.16 kg load).

4. Melting Temperature

The melting points (T$_m$) were determined on a DSC Q2000 TA Instrument, by placing a 5-7 mg polymer sample, into a closed DSC aluminum pan, heating the sample from −30° C. to 225° C. at 10° C./min, holding for 10 min at 225° C., cooling from 225° C. to −30° C., holding for 5 min at −30° C., heating from −30° C. to 225° C. at 10° C./min. The reported values are those of the peak of the endothermic heat flow determined from the second heating scan II. Polymerisation Experiments In the Inventive Examples, the following external donors were used:

Thexyltrimethoxysilane (in the following referred to as "Donor ID1" or "ID1"), CAS no 142877-45-0

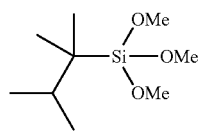

(2,3-dimethylbutan-2-yl)
trimethoxysilane
or
Thexyltrimethoxysilane

Thexyltriethoxysilane (in the following referred to as "Donor ID2" or just "ID2"), CAS no 142877-46-1

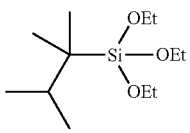

(2,3-dimethylbutan-2-yl)
triethoxysilane
or
Thexyltriethoxysilane)

Donors ID1 and ID2 were prepared according to the procedure described in EPO488595.

In the Comparative Examples, the following external donor was used:

Dicyclopentyldimethoxysilane (in the following referred to as "Donor D" or just "D"). CAS no126990-35-0

In all Examples, triethylaluminium (TEA) was used as the organometallic cocatalyst. The same Ziegler-Natta procatalyst was used in all Examples and was prepared as follows:

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the catalyst was filtered and dried. Catalyst and its preparation concept is described in general e.g. in patent publications EP491566, EP591224 and EP586390.

Polymerizations have been carried out in a 20-L bench scale reactor. The same Al/Ti and external donor/Ti molar ratios were used in all Examples: Al/Ti=250 mol/mol and external donor/Ti=25 mol/mol. A prepolymerization was carried out at 20° C., and liquid phase copolymerization was carried out at 75° C. Propylene and 1-butene have been fed to the reactor before the catalyst, and treated with 0 5 mmol TEA, in order to remove the remaining traces of impurities. The activated catalyst was fed last by means of a liquid propylene flow.

Catalyst Preactivation:

In the glovebox a defined amount of solid catalyst was transferred in a 20 ml stainless steel vial, with 10 ml hexane. Then 0.5 mmol triethylaluminium (TEA, 1 molar solution in hexane) was injected in a second steel vial with a total volume of 2 ml. Afterwards 2 mmol TEA+0.25 mmol donor (0.3 molar solution in hexane) were mixed for 5 minutes in a 5 ml syringe and added in the catalyst vial. In the following step, both vials were mounted on the autoclave Polymerization:

A stirred autoclave (double helix stirrer) with a volume of 21.2 dm$^3$ containing 0.2 barg propylene was filled with additional 4.33 kg propylene or with 3.45 kg propylene and the chosen amount of 1-butene (quality 2.6; supplier: AIR-Liquide) After adding 0.5 mmol TEA with 250 g propylene, a certain amount of H2 was added via mass flow controller (MFC). The solution was stirred at 20° C. and 250 rpm. After a total contact time of 5 min between the solid catalyst and the TEA/Donor solution, the catalyst was injected by means of 250 g propylene. Stirring speed was increased to 350 rpm (250 rpm for the terpolymerisation examples) and pre-polymerisation was run for 5 to 6 min at 20° C. The polymerisation temperature was then increased to 75° C. and held constant throughout the polymerization. In producing propylene-butene-ethylene terpolymer in addition a constant flow of 0.5 g/min of ethylene was fed via MFC throughout the polymerization (in Comparative Example 4 and Inventive example 6). For these experiments the reactor pressure was held at 29 bar-g by adding propylene via MFC.

The polymerization time was measured starting when the temperature reached 73° C. After 1 hour the reaction was stopped by adding 5 ml methanol, cooling the reactor and flashing the volatile components.

After flushing the reactor twice with N2 and one vacuum/ N$_2$ cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

The polymerization conditions/results are shown in Tables 1 and 2, and Tables 3 and 4.

TABLE 1

Polymerization conditions

| | Catalyst mg | External Donor | Al/Ti mol/mol | External Donor/Ti mol/mol | TEA1 added to monomers (1 molar) mmol | average calculated C4/(C3 + C4) weight fraction in liquid phase wt % | Average temperature °C. | H2 amount NL |
|---|---|---|---|---|---|---|---|---|
| CompEx1 | 24.6 | D | 250 | 25 | 0.5 | 24.7 | 75 | 27.3 |
| CompEx2 | 24.1 | D | 250 | 25 | 0.5 | 28.0 | 75 | 27.3 |
| CompEx3 | 24.9 | D | 250 | 25 | 0.5 | 35.0 | 75 | 27.3 |
| InvEx1 | 25.0 | ID1 | 250 | 25 | 0.5 | 18.2 | 75 | 10 |
| InvEx2 | 24.8 | ID1 | 250 | 25 | 0.5 | 24.0 | 75 | 10 |
| InvEx3 | 25.4 | ID1 | 250 | 25 | 0.5 | 30.8 | 75 | 10 |
| InvEx4 | 24.6 | ID2 | 250 | 25 | 0.5 | 17.5 | 75 | 6 |
| InvEx5 | 25.0 | ID2 | 250 | 25 | 0.5 | 22.8 | 75 | 6 |

TABLE 2

Polymerization results

| | Donor | total MFR$_2$ g/10 min | C4 total (IR) wt % | XS wt % | T$_m$ °C. |
|---|---|---|---|---|---|
| CompEx1 | D | 9 | 5.8 | 2.3 | 147.3 |
| CompEx2 | D | 8.8 | 6.2 | 2.4 | 146.7 |
| CompEx3 | D | 11 | 8.3 | 3.0 | 142.9 |
| InvEx1 | ID1 | 6 | 5.0 | 2.2 | 148.8 |
| InvEx2 | ID1 | 4.8 | 6.8 | 2.6 | 145.6 |
| InvEx3 | ID1 | 6.2 | 9.1 | 3.6 | 141.1 |
| InvEx4 | ID2 | 12.9 | 4.9 | 5.7 | 148.5 |
| InvEx5 | ID2 | 12.3 | 7.2 | 6.7 | 144.5 |

TABLE 3

Propylene-butene-ethylene polymerisation conditions

| | Catalyst amount mg | External donor | External Donor/Ti mol/mol | Al/Ti mol/mol | Average calculated C4/(C4 + C3) in liquid phase wt % | C2 feed g | Average temp in bulk °C. | Total H2 in bulk NL | Activity kgPP/gcat/h |
|---|---|---|---|---|---|---|---|---|---|
| CompEx4 | 25.5 | D | 25 | 250 | 21.8 | 30 | 75 | 12 | 66 |
| InvEx6 | 25.5 | ID1 | 25 | 250 | 20.8 | 30 | 75 | 12 | 64 |

TABLE 4

Polymer properties of Propylene-butene-ethylene terpolymers

| | External donor | MFR$_2$ g/10 min | C4 total (IR) wt % | C2 total (IR) wt % | XS wt % | Tm °C. |
|---|---|---|---|---|---|---|
| CompEx4 | D | 3.6 | 5.5 | 0.9 | 2.8 | 143.9 |
| InvEx6 | ID1 | 5.5 | 7.3 | 1.0 | 3.6 | 139.8 |

When evaluating a catalyst for its copolymerization performance, the most useful parameter to determine is the relative comonomer reactivity ratio R, which is defined by:

$$R = \frac{\left(\frac{C_4}{C_3}\right)_{polymer}}{\left(\frac{C_4}{C_3}\right)_{liq \cdot phase}}$$

R is specific for a given catalyst and monomer pair. Since the concentration of 1-butene increases over the polymerization time while that of propylene decreases, there is a significant difference in liquid phase composition between start and end of the polymerisation experiment. For this reason, as liquid phase composition values, the average of the initial and final calculated values was used.

The results are shown in FIG. 1 (i.e. relative C4/C3 reactivity ratio determination for Ziegler-Natta catalyst systems comprising external donor ID1, ID2, or D).

The values of R determined for the Ziegler-Natta catalyst system comprising external donor D (R=0.17) and the Ziegler-Natta catalyst system comprising external donor ID1 or ID2 (R=0.23) show that the external donor of the present invention increases the butene reactivity of the Ziegler-Natta catalyst system.

Figure 2:
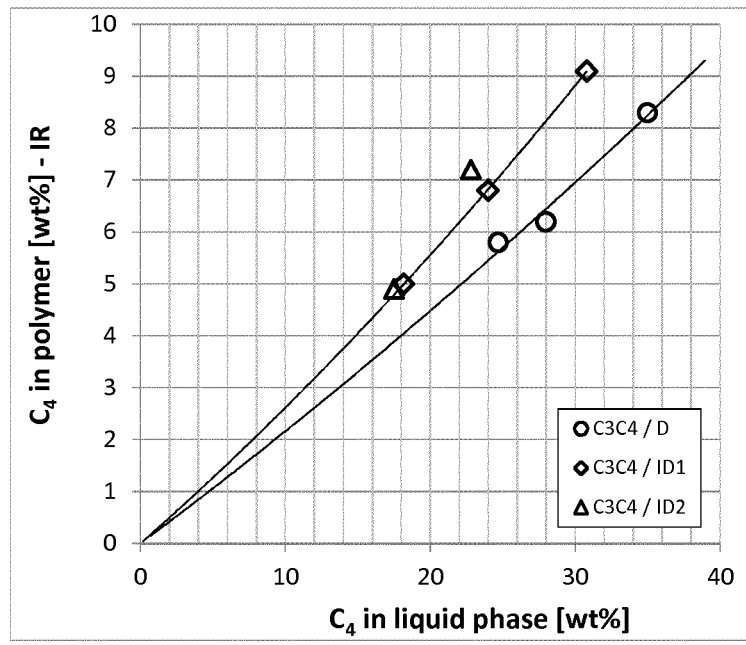

Turning the chart of FIG. 1 into wt % values provides the curves shown in FIG. 2 (correlation between wt % of C4 in the liquid phase and the copolymer composition). From FIG. 2, it can be concluded that, in order to produce a copolymer containing 9 wt % butene, the monomer feed requires 20% less butene when the ID1 donor is used (Inventive Examples 1-3), compared to the D donor (Comparative Examples 1-3).

The same can be concluded based on the melting point of the copolymers. The correlation between comonomer content and melting point of propylene-butene copolymers is well known, see for example Cimmino, Martuscelli, Nicolais, Silvestre in Polymer 1978,19,1222; Crispino, Martuscelli, Pracella in Makromol Chem 1980,181,1747; Abiru, Mizuno, Weigand in J Appl Polym Sci 1998;68:1493.

By comparing the melting points to the comonomer feed ratio, one can see that, at the same comonomer feed ratio, lower melting point (that is, higher butene content) is obtained using the catalyst system of the present invention compared to the catalyst system with the D donor. On the other hand, compared to the catalyst system with the D donor, the catalyst system of the present invention requires a lower butene/propylene ratio in the feed to produce a copolymer with the same melting point.

So, as demonstrated above, the Ziegler-Natta catalyst system comprising the external donor of the present invention has a very high reactivity for 1-butene, thereby requiring less 1-butene in the monomer feed.

This means that less unreacted 1-butene has to be removed from the final polymer, with the operability advantage of reducing the degassing time, resulting in a higher throughput.

The invention claimed is:

1. An olefin polymerization process comprising reacting propylene, 1-butene, and ethylene in the presence of a Ziegler-Natta catalyst system to obtain a polypropylene,
   wherein the polypropylene is a terpolymer and comprises 1-butene-derived comonomer units in an amount of from 5 to 20 wt % and ethylene-derived comonomer units in an amount of up to 3 wt %, and
   wherein the Ziegler-Natta catalyst system comprises an external donor of the following formula (I)

$$(R^3)_z(R^2O)_y Si(R^1)_x \quad (I)$$

wherein
   x is 1 or 2; y is 2 or 3; and z is 0 or 1; under the provision that x+y+z=4;
   $R^1$ is an organic residue of the following formula (II)

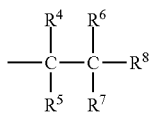

(II)

wherein
   a carbon atom bonded to the Si atom is a tertiary carbon atom and each of the residues $R^4$ and $R^5$ bonded to the tertiary carbon atom is, independently, a $C_{1-2}$ alkyl;
   each of the residues $R^6$ and $R^7$ is, independently, a $C_{1-2}$ alkyl;
   $R^8$ is hydrogen or a $C_{1-4}$ alkyl;
   $R^2$ is $C_{1-2}$ alkyl; and
   $R^3$ is $C_{1-4}$ alkyl.

2. The process according to claim 1, wherein $R^3$ is methyl or ethyl.

3. The process according to claim 1, wherein x is 1, $R^4$, $R^5$, $R^6$ and $R^7$ are methyl, and $R^8$ is hydrogen or $C_{1-2}$ alkyl.

4. The process according to claim 1, wherein the polypropylene has an amount of xylene solubles XS of 10.0 wt % or less and/or a melt flow rate $MFR_2$ of from 1.0 to 100 g/10 min.

5. The process according to claim 1, wherein the Ziegler-Natta catalyst system comprises:
   a Ziegler-Natta procatalyst which comprises a titanium compound, and
   an organometallic cocatalyst which comprises an aluminium compound.

6. The process according to claim 1, wherein a molar ratio of aluminium to Ti in the Ziegler-Natta catalyst system is from 10/1 to 1000/1 and/or a molar ratio of the external donor to Ti in the Ziegler-Natta catalyst system is from 1/1 to 100/1.

7. The process according to claim 5, wherein the Ziegler-Natta procatalyst is obtained by
   a) reacting a spray crystallized or emulsion solidified adduct of $MgCl_2$ and a $C_1$-$C_2$ alcohol with $TiCl_4$ and
   b) reacting the product of a) with a dialkylphthalate of formula:

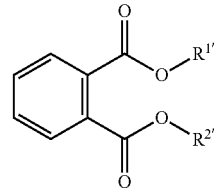

wherein $R^{1'}$ and $R^{2'}$ are independently an alkyl group having at least 5 carbon atoms,
under conditions where a transesterification between said $C_1$ to $C_2$ alcohol and said dialkylphthalate takes place;
   a) optionally washing the product of b) and/or
   b) optionally reacting the product of b) or c) with additional $TiCl_4$.

8. A process for preparing a film comprising preparing a polypropylene by the olefin polymerization process according to claim 1 and processing the polypropylene to a film.

9. The process according to claim 3, wherein the polypropylene has an amount of xylene solubles XS of 10.0 wt % or less and/or a melt flow rate $MFR_2$ of from 1.0 to 100 g/10 min.

10. The process according to claim 3, wherein the Ziegler-Natta catalyst system comprises:
    a Ziegler-Natta procatalyst which comprises a titanium compound, and
    an organometallic cocatalyst which comprises an aluminium compound.

11. The process according to claim 3, wherein a molar ratio of aluminium to Ti in the Ziegler-Natta catalyst system is from 10/1 to 1000/1 and/or a molar ratio of the external donor to Ti in the Ziegler-Natta catalyst system is from 1/1 to 100/1.

12. The process according to claim 3, wherein the Ziegler-Natta procatalyst is obtained by
    a) reacting a spray crystallized or emulsion solidified adduct of $MgCl_2$ and a $C_1$-$C_2$ alcohol with $TiCl_4$ and
    b) reacting the product of a) with a dialkylphthalate of formula:

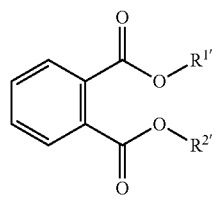
wherein $R^{1'}$ and $R^{2'}$ are independently an alkyl group having at least 5 carbon atoms,
under conditions where a transesterification between said $C_1$ to $C_2$ alcohol and said dialkylphthalate takes place;
a) optionally washing the product of b) and/or
b) optionally reacting the product of b) or c) with additional $TiCl_4$.
\* \* \* \* \*